(12) United States Patent
Spiegel et al.

(10) Patent No.: US 11,640,606 B2
(45) Date of Patent: May 2, 2023

(54) SYSTEMS AND METHODS FOR PROVIDING REAL-TIME WARNINGS TO MERCHANTS FOR DATA BREACHES

(71) Applicant: CAPITAL ONE SERVICES, LLC, McLean, VA (US)

(72) Inventors: Philip Spiegel, Midlothian, VA (US); Noble Ozoka, Henrico, VA (US); Varun Gupta, Edison, NJ (US); Michael Snyder, Redwood City, CA (US); Matthew Reedy, Midlothian, VA (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/669,658

(22) Filed: Oct. 31, 2019

(65) Prior Publication Data

US 2021/0133741 A1    May 6, 2021

(51) Int. Cl.
*G06Q 40/00*  (2012.01)
*G06Q 20/40*  (2012.01)
(Continued)

(52) U.S. Cl.
CPC .......... *G06Q 20/40* (2013.01); *G06Q 20/047* (2020.05); *G06Q 20/10* (2013.01); *G06Q 20/12* (2013.01); *G06Q 20/20* (2013.01); *G06Q 30/06* (2013.01)

(58) Field of Classification Search
USPC ................ 705/44, 39, 38, 37; 719/328, 315; 717/108; 709/226, 227, 26.4, 217, 218;
(Continued)

(56) References Cited

U.S. PATENT DOCUMENTS

| 8,285,639 | B2 * | 10/2012 | Eden | G06Q 20/04 |
| | | | | 705/40 |
| 8,458,069 | B2 * | 6/2013 | Adjaoute | G06Q 40/02 |
| | | | | 705/318 |

(Continued)

OTHER PUBLICATIONS

Mobile phone based RFID architecture for secure electronic Payments using RFID credit cards; The Second International Conference on Availability, Reliability and Security (ARES'07) (pp. 610-620); G. Venkataramani, S. Gopalan. Apr. 10, 2007 (Year: 2007).*

(Continued)

*Primary Examiner* — Tien C Nguyen
(74) *Attorney, Agent, or Firm* — Perkins Coie LLP

(57) ABSTRACT

The disclosed embodiments provide systems and methods for providing real-time warnings to merchants for data breaches. For example, the system may include one or more memory devices storing instructions and one or more processors configured to perform operations consistent with this disclosure. The operations may include collecting and storing transaction authorization requests from one or more merchants. The transaction authorization requests may include a virtual account number associated with an account, the virtual account number being previously bound to a merchant and reusable only for the bound merchant. The operations may further include detecting an event at the bound merchant based on, for example, a transaction authorization request having a mismatch between a transacting merchant and the bound merchant. The operations my further include communicating notification of the event through a communication interface with the bound merchant.

13 Claims, 8 Drawing Sheets

(51) Int. Cl.
  *G06Q 20/10* (2012.01)
  *G06Q 30/06* (2023.01)
  *G06Q 20/20* (2012.01)
  *G06Q 20/12* (2012.01)
  *G06Q 20/04* (2012.01)

(58) Field of Classification Search
  USPC ..... 726/9; 700/245, 236; 235/375, 380, 379; 340/540
  See application file for complete search history.

(56) References Cited

U.S. PATENT DOCUMENTS

| | | | | |
|---|---|---|---|---|
| 8,949,150 | B2* | 2/2015 | Siddens | G06Q 20/4016 705/50 |
| 9,058,607 | B2* | 6/2015 | Ganti | G06Q 30/0185 |
| 10,037,532 | B2* | 7/2018 | Birukov | G06Q 20/4016 |
| 10,275,613 | B1* | 4/2019 | Olenoski | H04L 63/20 |
| 10,373,160 | B2* | 8/2019 | Ranganathan | G06Q 20/3224 |
| 10,445,735 | B1* | 10/2019 | Allen | G06Q 20/4016 |
| 10,692,058 | B2* | 6/2020 | Zoldi | G06Q 20/10 |
| 2010/0077464 | A1* | 3/2010 | Hardy-McGee | G06Q 10/06 715/742 |
| 2018/0158044 | A1* | 6/2018 | Beck | G06Q 20/3224 |
| 2019/0205971 | A1* | 7/2019 | Deo | G06Q 30/0641 |

OTHER PUBLICATIONS

An investigation into credit card information disclosure through Point of Sale purchases; 2015 Information Security for South Africa (ISSA) (pp. 1-8); S. von Solms; Aug. 12, 2015. (Year: 2015).*

Fraud Detection in Credit Card Transactions by using Classification Algorithms; 2017 International Conference on Current Trends in Computer, Electrical, Electronics and Communication (CTCEEC) (pp. 125-131); J Vimala Devi, K.S Kavitha; Sep. 8, 2017. (Year: 2017).*

* cited by examiner

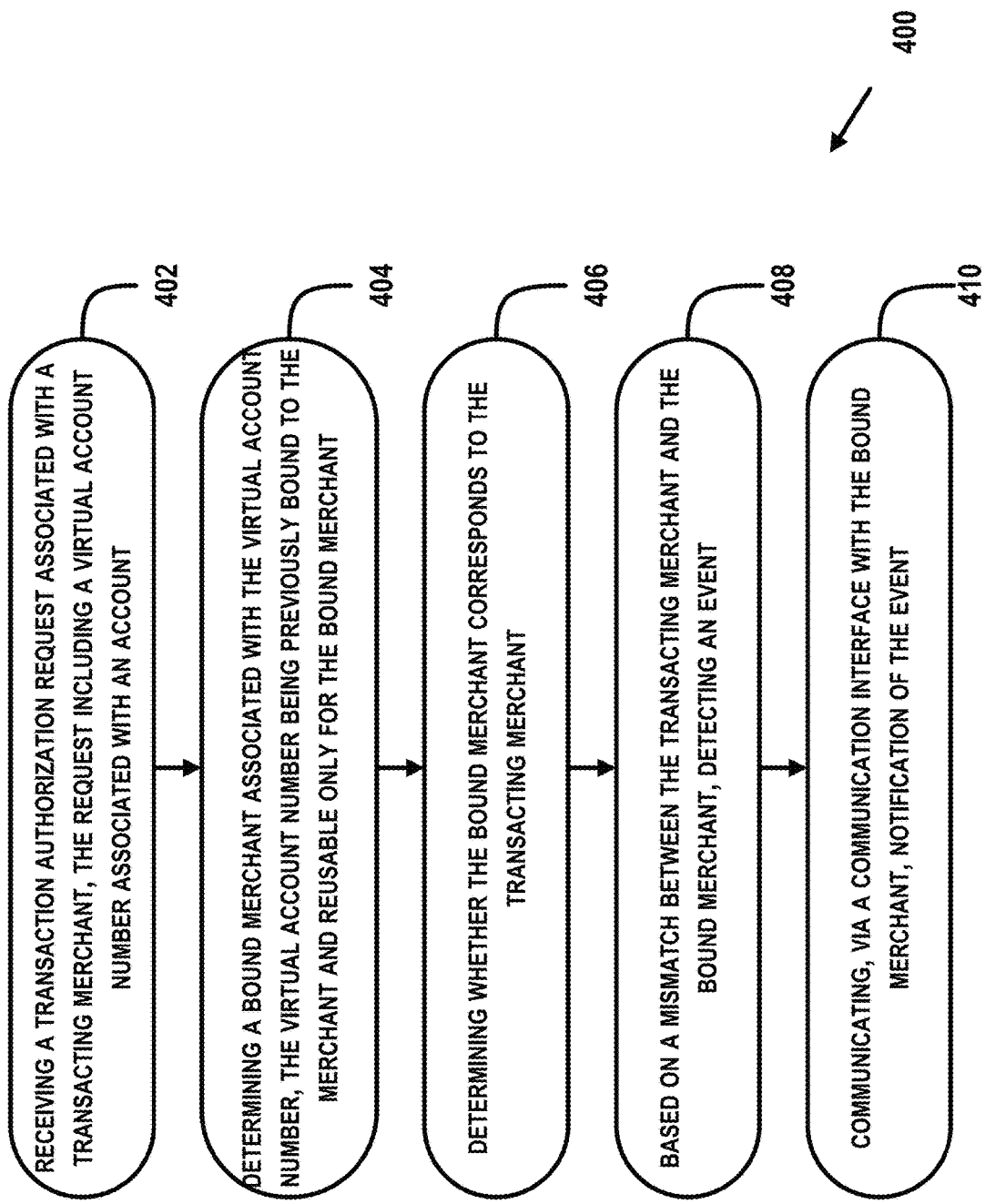

SYSTEMS AND METHODS FOR PROVIDING REAL-TIME WARNINGS TO MERCHANTS FOR DATA BREACHES

TECHNICAL FIELD

The present disclosure provides systems and methods for providing real-time warnings to merchants for data breaches. In particular, in some embodiments, the use of a virtual account number may enable a financial service provider to detect data breaches and other events at an earlier point in time. This may enable a financial service provider to make early use of communication channels to warn the merchant of a data breach, allowing the merchant to take remedial action at an earlier point in time and reduce the overall impact of merchant data breaches on financial institutions and customers.

BACKGROUND

Merchants are a key location where thieves may steal sensitive customer data that may later be used in fraudulent transaction authorization requests. There are many different events where a data breach may occur. For example, a thief may fraudulently obtain customer data through a data breach where a merchant's database is hacked or where a merchant's website is infected with a listening virus that is able to capture sensitive customer data, such as a credit card number.

Typically, a credit card issuer or other financial service provider relies on transaction authorization requests reported as fraudulent by customers to detect an event at a merchant. Customer reports may be an inefficient and unreliable method of detecting an event at a merchant, however, as fraudulent behavior may only be reported to a financial service provider when and if the customer notices that a fraudulent transaction has occurred through their financial service account. The customer may have a credit card number on file or may have used the credit card number at multiple merchants, making it difficult to determine where the event may have occurred. By using these typical methods, a financial service provider may not become aware of the event before the merchant. Even in situations where a financial service provider does become aware of the event before the merchant, a significant amount of time may have elapsed since the event occurred, resulting in a larger impact on the merchant and affected customers.

In view of the shortcomings of current systems and methods for detecting data breaches at merchants, a real-time, quick, and consistent mechanism for detecting such events at merchants and notifying the merchants of the occurrence of such events is desired.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Disclosed embodiments provide methods for providing real-time warnings to merchants for data breaches. For example, certain embodiments may include a computer-implemented method including receiving a transaction authorization request associated with a transacting merchant, where the authorization request includes a virtual account number associated with an account. A transaction authorization request may indicate at least of one of a time, a location, and an amount of the transaction. Consistent with the present disclosure, the method may also include determining a bound merchant associated with the received virtual account number, where the virtual account number has been previously bound to the merchant and reusable only for the bound merchant. In some embodiments, the method may include determining whether the bound merchant corresponds to the transacting merchant, and detecting an event based on a mismatch between the transacting merchant and the bound merchant. In some embodiments, detecting the event may include comparing the transacting merchant with the bound merchant and detecting the event based on the comparison. The method may also include determining a volume of transaction authorization requests associated with the transacting merchant and detecting the event based on the volume of transaction authorization requests. In some embodiments, the method may include detecting the event based on at least one of the time, the location, and the amount of the transaction authorization request. In some embodiments, the method may include detecting the event based on the bound customer. In some embodiments, the method may include requesting a response from the bound customer, and based on the response, detecting the event, and may further include notifying the bound customer of the event. Consistent with the present disclosure, the method may also include communicating, via a communication interface with the bound merchant, notification of the detected event.

Disclosed embodiments provide methods for providing real-time warnings to merchants for data breaches. For example, certain embodiments may include a computer-implemented method including receiving a plurality of transaction authorization requests from a plurality of merchants, where each transaction authorization request indicates a transacting merchant and comprises a virtual account number associated with an account. The method may also include, for each transaction authorization request in the plurality of transaction authorization requests, (i) determining a bound merchant associated with the received virtual account number, the virtual account number being previously bound to the bound merchant and reusable only for the bound merchant, and (ii) making a comparison between the bound merchant and the transacting merchant. In some embodiments, the method may include detecting an event at a first bound merchant based on said comparison. In some embodiments, detecting the event at the first merchant may include determining, for a first authorization request, that (i) the first bound merchant is associated with the received virtual account number and (ii) the transacting merchant is not the first bound merchant. Detecting the event may also include determining, for two or more authorization requests, that (i) the first bound merchant is associated with the received virtual account numbers and (ii) the transacting merchants are not the first bound merchant. In some embodiments determining a volume of transaction authorization requests associated with the first bound merchant, determining a threshold for the first bound merchant based on the volume, and detecting the event based on the threshold. In some embodiments, when each transaction authorization request indicates a location, detecting the event may include detecting the event based on the locations and a location of the bound first merchant. Consistent with the present disclosure, the method may include communicating, via a communication interface with the first bound merchant, notification of the detected event.

Disclosed embodiments provide systems for providing real-time warnings to merchants for data breaches. For example, certain embodiments may include a system with data storage including, for each bound merchant in a plurality of bound merchants, (i) a plurality of virtual account numbers, each virtual account number being previously bound to the merchant and reusable only for the bound merchant and (ii) a history of transaction authorization requests, where each transaction authorization request comprises one of the plurality of virtual account numbers. The system may also include a communication interface communicatively coupled to the plurality of bound merchants. In some embodiments, the system may include a detection module which may be configured to receive through the communication interface a first transaction authorization request from a first transacting merchant, where the first transaction authorization request comprises a first virtual account number; determine a first bound merchant associated with the received virtual account number; detect an event based on the first bound merchant, the first transacting merchant, and the history of transaction authorization requests for the first bound merchant; and communicate, via the communication interface, notification of the detected event. In some embodiments, detecting the event may include determining whether the first bound merchant corresponds to the first transacting merchant; and detecting an event based on a mismatch between the first transacting merchant and the first bound merchant. Detecting the event may also include determining, based on the history of transaction authorization requests for the first bound merchant, a volume of transaction authorization requests for the first bound merchant; and detecting the event based on the volume of transaction authorization requests for the first bound merchant. In some embodiments, detecting the event may include making a first comparison between the first transaction merchant and the first bound merchant; for each transaction authorization request in the history of transaction authorization requests for the first bound merchant, making a second comparison between the transacting merchant and the first bound merchant; and detecting the event based on the first comparison and the second comparison. In some embodiments, communicating notification of the detected event may include communicating the notification to the first bound merchant. In some embodiments, the first virtual account number may indicate a bound customer; and communicating notification of the detected event may include communicating the notification to the bound customer. It is to be understood that both the foregoing general description and the following detailed description are exemplary and explanatory only, and are not restrictive of the disclosed embodiments, as claimed.

BRIEF DESCRIPTION OF DRAWING(S)

The accompanying drawings, which are incorporated in and constitute a part of this specification, illustrate several embodiments and, together with the description, serve to explain the disclosed principles. In the drawings:

FIG. 4 is a flow chart of an exemplary process for detecting an event at a merchant based on a transaction authorization request and notifying the merchant of the event, consistent with disclosed embodiments.

Figure 6:
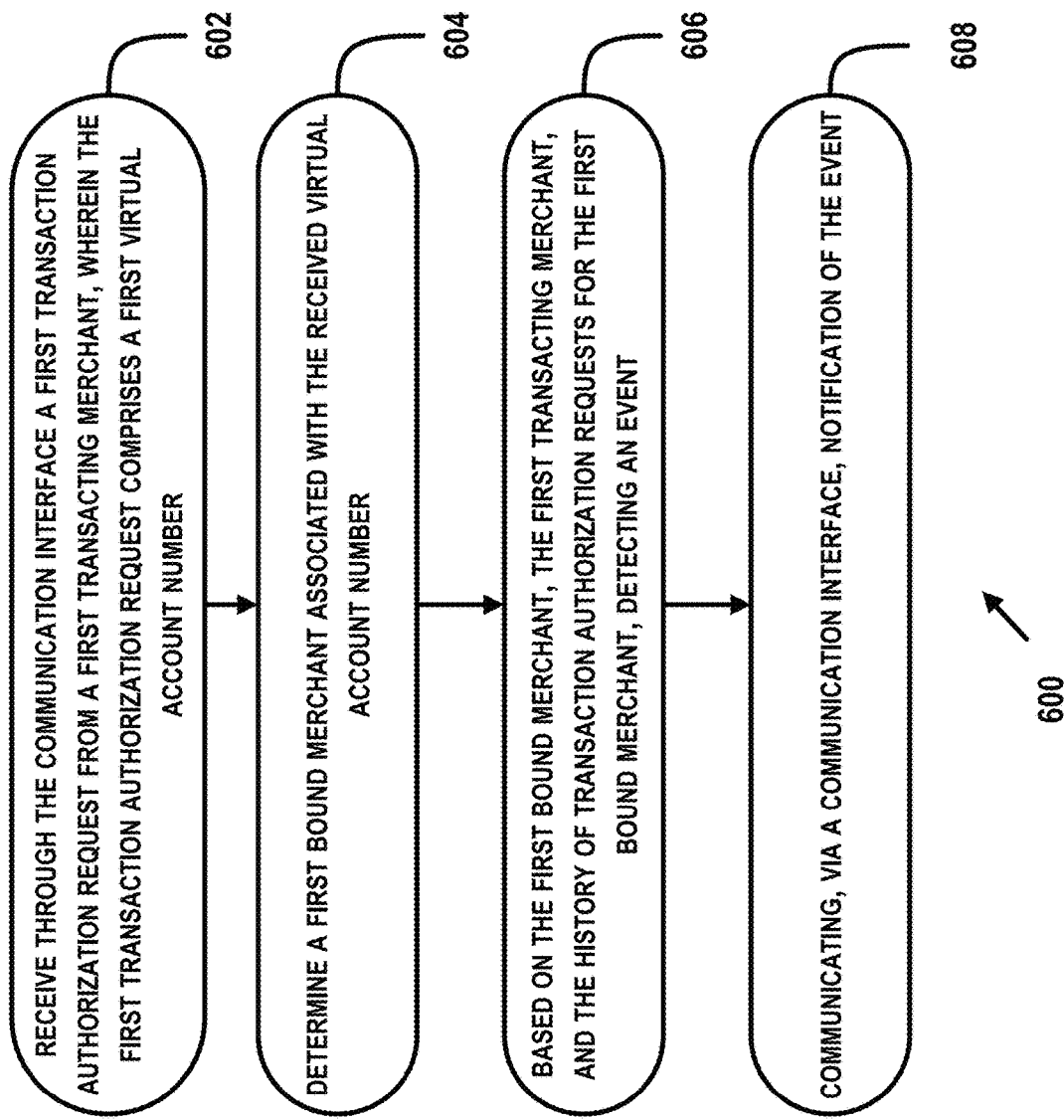

FIG. 6. is flow chart of an exemplary process for implementation in disclosed systems for detecting an event based on a first bound merchant, a first transacting merchant and a history of transaction authorization requests for the first bound merchant, consistent with disclosed embodiments.

Figure 7:
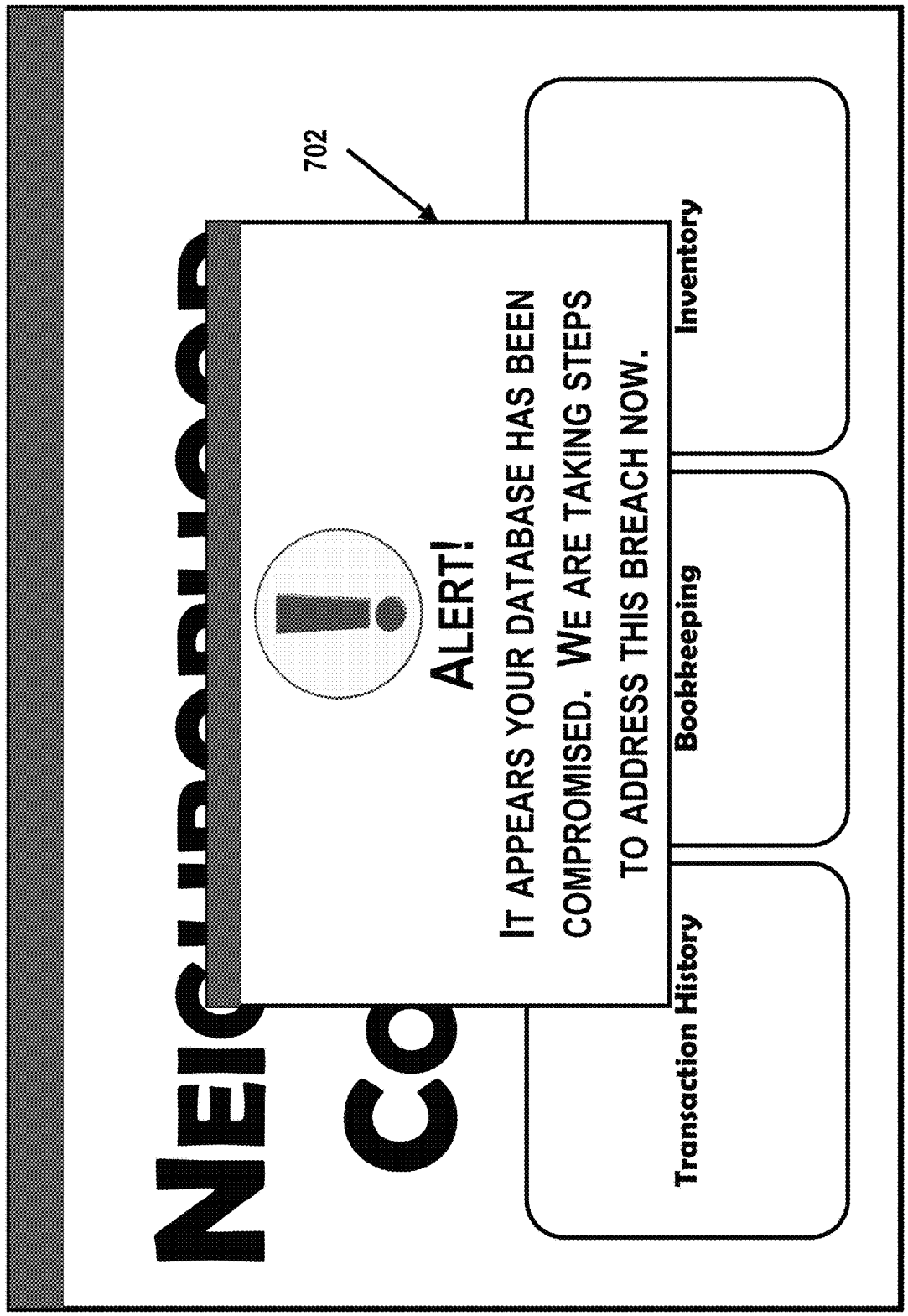

FIG. 7 is an illustration of an exemplary communication interface, consistent with the present disclosure.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

As described in further detail herein, the disclosed embodiments are directed to systems and methods for providing real-time warnings to merchants for data breaches.

Figure 1:
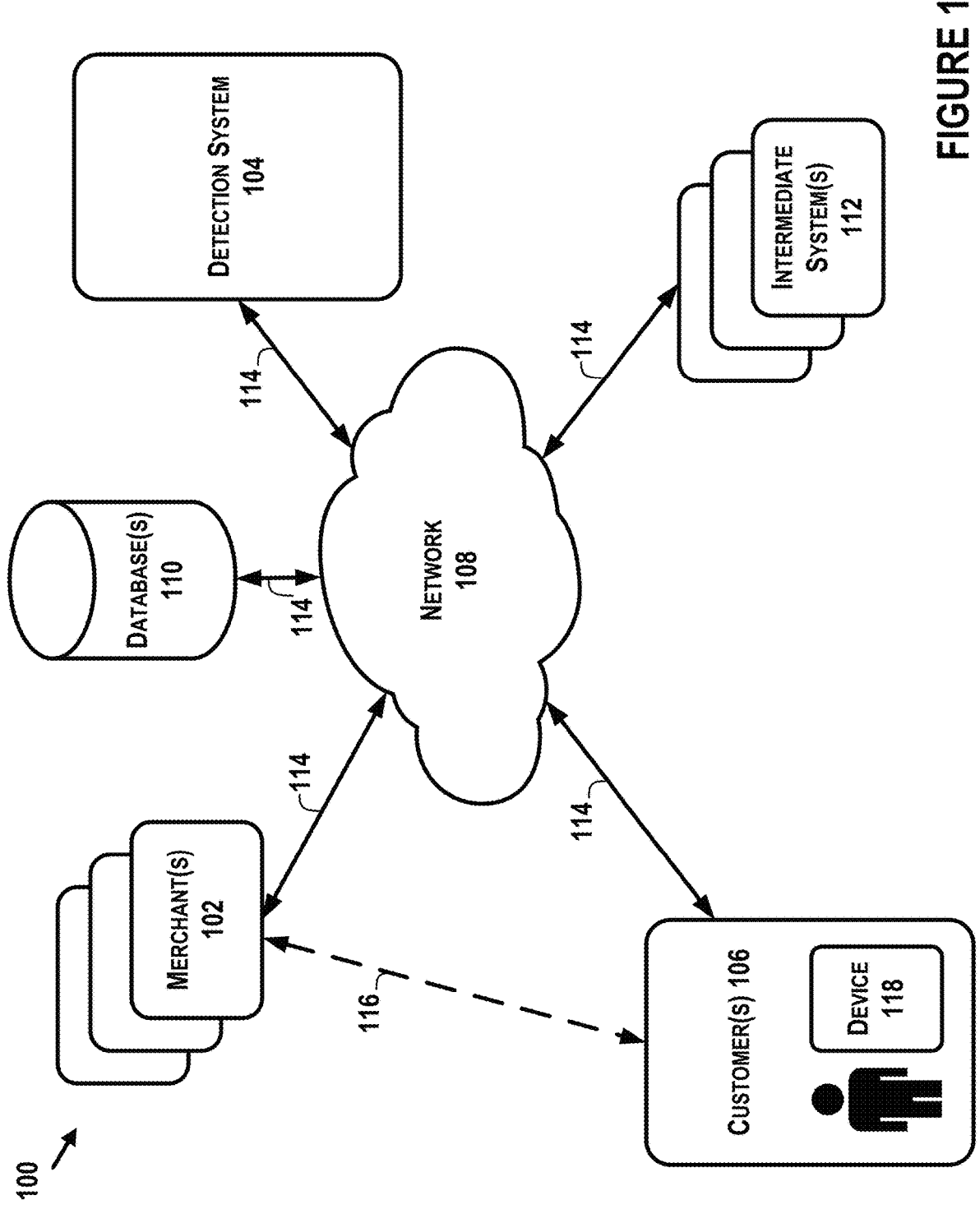
FIG. 1 is a block diagram of an exemplary detection and notification system, consistent with disclosed embodiments.

FIG. 1 is a block diagram of an exemplary detection and notification system 100, consistent with disclosed embodiments. Through this system, data breaches at merchant(s) 102 may be detected in real-time, and thus merchant(s) 102 may then be notified of a data breach in a much shorter time period than possible through alternative available methods. This may be achieved, for example, through the maintenance and analysis of virtual account numbers. The term "virtual account number" refers to a unique, merchant-specific reusable token, set up by a customer 106 and linked to the customer's financial service provider. Each virtual account number may be bound to the merchant and/or the customer, as discussed in greater detail below. For example, a customer 106 may, through detection system 104, set up a virtual account number that is bound to a specific merchant 102. Thereafter, the customer 106 may use the virtual account number to conduct transactions between customer 106 and merchant 102. Once the virtual number has been bound to the merchant, the merchant may associate the virtual number with an account associated with the customer for use in future transactions.

When the customer 106 makes a purchase at a merchant 102 using the virtual account number, the merchant transaction authorization request requesting to authorize the transaction to one or more intermediate system(s) 112 in system 100, such as a financial service provider of the customer 106, and/or to the detection system 104. The transaction authorization request may include the virtual account number. The financial service provider may authorize the transaction based on information received in the transaction authorization request, including the virtual account number. Alternatively or additionally, the detection system 104 may analyze the information, including the virtual account number, to determine whether an event, such as a data breach, has occurred at another merchant, as described below in further detail.

This capability of the virtual account number provides a unique advantage over the use of credit card numbers for authorizing transactions, that is, there is no way of definitively determining where an event or breach may have occurred when a credit card number (i.e. the number that is physically associated with the card and used across multiple merchants) is used in a fraudulent transaction authorization request. For example, if a customer's credit card number is compromised due to the occurrence of an event at a specific merchant, a subsequent fraudulent transaction authorization request using the credit card number would not indicate where the event may have occurred, as the customer may have used that credit card number to authorize transactions at a large number of merchants. On the other hand, if a customer's merchant bound virtual account number is compromised due to the occurrence of an event at a specific merchant, a subsequent fraudulent transaction authorization request using the virtual account number at a merchant that is not the bound merchant would immediately suggest that an event may have occurred at the bound merchant.

In some embodiments, detection system 104 may generate and maintain a number of virtual account numbers and transaction histories. Each virtual account number may, for example, take the form of a 16-digit number similar to a credit card number. Each virtual account number may identify and/or may be associated with a single bound merchant among the merchant(s) 102 and a single bound customer among the customer(s) 106. The bound customer may use the virtual account number as he or she would a credit card number to conduct a transaction at the bound merchant. Each transaction history may include a number of transaction authorization requests carried out at a merchant 102. Each transaction authorization request may specify a transacting merchant among the merchant(s) 102 at which the transaction occurred, a transacting customer among the customer(s) 106 that initiated the transaction, and other data associated with the transaction, such as a time of the transaction, a location of the transaction, an amount of the transaction, a product, service, or information associated with the purchase, or other information relating to the transaction. Detection system 104 may detect one or more events based on the virtual account numbers and the transaction histories, as described below.

An event may occur at merchant(s) 102 due to, for example, a data breach. Once a virtual account number has been generated and established for the customer 106 and merchant 102, it may be stored in a user's profile on a database of the merchant 102, for example, for future use. In some embodiments, an event may occur when the database of the merchant or transaction authorization system, for example, of a merchant 102 is compromised or hacked. In this event, someone who is not the customer 106 (e.g., a fraudster) may obtain unauthorized access to the virtual account number of customer 106 and attempt to use it to authorize transactions at one or more merchant(s) 102. A fraudster may also obtain unauthorized access, for example, by intercepting the virtual account number in transmission to the merchant 102 using malicious scripts on the merchant's webpage. In some embodiments, detection system 104 may receive the transaction authorization requests for such transactions and perform an analysis on the information contained in the transaction authorization request to determine that the transacting merchant requesting authorization is not the merchant 102 that has been previously bound to the virtual account number. Such a mismatch may indicate that an event has occurred at the merchant 102. When detection system 104 may make a determination that an event has occurred at merchant 102, detection system 104 may communicate notification of the event to the merchant 102 through communication channels 114 in network 108.

As shown in FIG. 1, detection and notification system 100 may include a merchant(s) 102, a detection system 104, a customer(s) 106, a database(s) 110, an intermediate system (s) 112, and a network 108 to facilitate communication(s) 114 among the components of system 100. The components and arrangement of the components included in system 100 may vary. Thus, system 100 may further include other components that perform or assist in the performance of one or more methods consistent with the disclosed embodiments. The components and arrangements shown in FIG. 1 are not intended to limit the disclosed embodiments, as the components used to implement the disclosed methods and features may vary.

In accordance with disclosed embodiments, system 100 may include a detection system 104. Detection system 104 may be a system associated with a financial service provider (not shown), such as a bank, a credit card issuer, a lender, brokerage firm, or any other type of financial service entity that generates, provides, manages, and/or maintains financial service accounts, etc., for one or more customers. Detection system 104 may include one or more computing systems that are configured to execute software instructions stored on one or more memory devices to perform one or more operations consistent with the disclosed embodiments. For example, detection system 104 may include one or more memory device(s) storing data and software instructions, and one or more processor(s) configured to use the data and execute the software instructions to perform server-based functions and operations known to those skilled in the art. Detection system 104 may include one or more general purpose computers, mainframe computers, or any combination of these types of components. An exemplary detection system consistent with detection system 104 is discussed in additional detail below in connection with FIG. 2.

System 100 may also include one or more merchant(s) 102 and/or one or more customer(s) 106. The term "merchant" may refer to any entity that offers for sale goods, services, and/or information, such as a retailer (e.g., Macy's®, Target®, etc.), grocery store, service provider (e.g., utility company, etc.), or any other type of entity that offers goods, services, and/or information that customers (e.g., end-customers or other business entities) may purchase, consume, use, etc. The term "customer" may refer to any entity that initiates a transaction at a merchant 102. The customer may be, for example, a person or company and/or one or more devices associated with the person or company. In one example, a customer (e.g., customer(s) 106) may purchase a product or service from a merchant 102 online through communications 114 between network 108 and a customer device 118. In another example, a merchant may be associated with a merchant brick-and-mortar location that a customer 106 may physically visit and purchase a product or service through an in-person transaction 116. The merchant 102 may also include back-end and/or front-end computing components that store data and execute software instructions to perform operations consistent with disclosed embodiments, such as computers that are operated by employees of the merchant (e.g., back office systems, etc.). In some embodiments, a merchant 102 may utilize one or more computing systems, such as servers, desktop computers, point-of-sale devices, etc., that are configured to execute stored software instructions to perform operations associated with a merchant consistent with the disclosed embodiments. For example, a merchant 102 may utilize computing devices to execute processes associated with processing transaction authorization requests, generating transaction data, generating product data (e.g., SKU data) relating to transaction authorization requests, etc.

In some embodiments, system 100 may also include one or more databases 110. While database 110 is shown separately, in some embodiments database 110 may be associated with and/or included in one or more of merchant(s) 102 and detection system 104. Database 110 may include one or more memory device(s) that store data that may be used for performing one or more processes consistent with the disclosed embodiments. The data may include, for example, transaction histories, transaction authorization requests, and/or virtual account numbers generated and/or maintained at detection system 102. In some embodiments, database 110 may include one or more servers or other types of computer devices and, in some embodiments, may be configured to execute software instructions stored in memory to perform one or more processes consistent with the disclosed embodiments. For example, database 110 may include one or more memory device(s) storing data and software instructions, and one or more processor(s) configured to use the data and execute the software instructions to perform server-based functions and operations known to those skilled in the art.

Database 110 may be configured to collect, store, and access data, including carrying out one or more processes associated with gathering data from a variety of sources, compiling the data, and organizing the data into accessible profiles. Database 110 may take the form of a general-purpose computer, a mainframe computer, or any combination of these components. In certain embodiments, database 110 may be configured as a particular apparatus, system, and the like based on the storage, execution, and/or implementation of the software instructions that perform one or more operations consistent with the disclosed embodiments. A database 110 may be standalone, or it may be part of a subsystem, which may be part of a larger system. For example, database 110 may represent distributed servers that are remotely located and communicate over a public network (e.g., network 108) or a dedicated network, such as a LAN.

In certain embodiments, database 110 may be associated with an entity, such as a company, organization, agency, etc. In some embodiments, the database entity may be a different entity than merchant(s) 102 and/or a financial service provider associated with detection system 104. In other embodiments, database 110 may be associated with a financial service provider or other entity associated with detection system 104. For example, database 110 may be a part or subpart of detection system 104.

System 100 may also include network 108. Network 108 may include any type of computer networking arrangement used to exchange data. For example, network 108 may be the Internet, a private data network, a virtual private network using a public network, a Wi-Fi network, a LAN or WAN network, and/or other suitable connections that may enable information exchange among various components of the system 100. Network 108 may also include a public switched telephone network ("PSTN") and/or a wireless cellular network. Network 108 may be a secured network or unsecured network. In other embodiments, one or more components of system 100 may communicate directly through a dedicated communication link(s).

Additionally or alternatively, network 108 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, a device associated with a customer 106 and/or a merchant 102 may connect and communicate with detection system 104 through a direct communications network.

Other components (e.g., intermediate system(s) 112) known to one of ordinary skill in the art may be included in system 100 to process, transmit, provide, and receive information consistent with the disclosed embodiments. In some embodiments, intermediate system(s) 112 may be associated with one or more financial service providers, such as credit card companies. Communications between merchant(s) 102, detection system 104, customer(s) 106, and/or database(s) 110 may, in some embodiments, be shared with, pass through, or otherwise involve intermediate system(s) 112.

Figure 2:
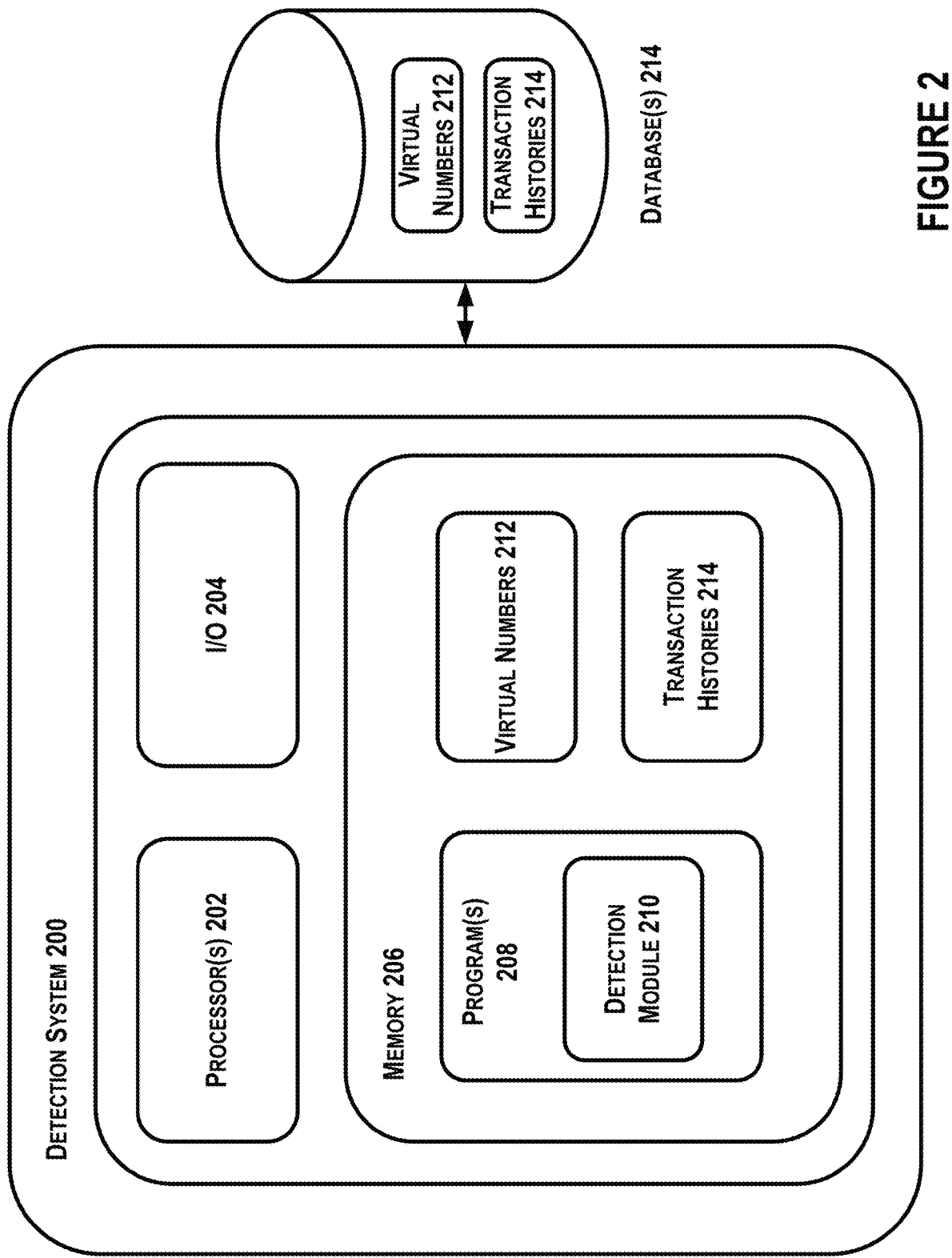
FIG. 2 is a block diagram of an exemplary detection system, consistent with disclosed embodiments.

FIG. 2 is a block diagram of an exemplary detection system 200, consistent with disclosed embodiments. FIG. 2 shows a detection system configuration that may be associated with a detection and notification system 100 or one or more of the components of system 100, consistent with disclosed embodiments. In some embodiments, detection system 200 may include one or more processor(s) 202, one or more memories 206, and one or more input/output (I/O) devices 204. In some embodiments, detection system 200 may take the form of a server, general purpose computer, a mainframe computer, laptop, smartphone, mobile device, or any combination of these components. In certain embodiments, detection system 200 (or a system including detection system 200) may be configured as a particular apparatus, system, and the like based on the storage, execution, and/or implementation of the software instructions that cause a processor to perform one or more operations consistent with the disclosed embodiments. Detection system 200 may be standalone, or it may be part of a subsystem, which may be part of a larger system.

Processor 202 may include one or more known processing devices, such as a microprocessor from the Pentium™ or Xeon™ family manufactured by Intel™, the Turion™ family manufactured by AMD™, or any of various processors manufactured by Sun Microsystems. Processor 202 may constitute a single core or multiple core processor that executes parallel processes simultaneously. For example, processor 202 may be a single core processor configured with virtual processing technologies. In certain embodiments, processor 202 may use logical processors to simultaneously execute and control multiple processes. Processor 202 may implement virtual machine technologies, or other known technologies to provide the ability to execute, control, run, manipulate, store, etc. multiple software processes, applications, programs, etc. In some embodiments, processor 202 may include a multiple-core processor arrangement (e.g., dual, quad core, etc.) configured to provide parallel processing functionalities to allow detection system 200 to execute multiple processes simultaneously. One of ordinary skill in the art would understand that other types of processor arrangements could be implemented that provide for the capabilities disclosed herein. The disclosed embodiments are not limited to any type of processor(s) configured in detection system 200.

Memory 206 may include one or more storage devices configured to store instructions used by processor 202 to perform on or more features of the disclosed embodiments. For example, memory 206 may be configured with one or more software instructions, such as program(s) 208 that may perform one or more operations when executed by processor 202. The disclosed embodiments are not limited to separate programs or computers configured to perform dedicated tasks. For example, memory 206 may include a program 208 that performs the functions of detection system 200, or program 208 could include multiple programs, including detection module 210. Additionally, processor 202 may execute one or more programs located remotely from detection system 200. For example, database 214 may, via detection system 200 (or variants thereof), access one or more remote programs that, when executed, perform functions related to certain disclosed embodiments. Processor 202 may further execute one or more programs located in database 214. In some embodiments, programs 208 may be stored in an external storage device, such as a cloud server located outside of computing system 200, and processor 202 may execute programs 208 remotely.

Memory 206 may include one or more memory devices that store data and instructions used to perform one or more features of the disclosed embodiments. For example, memory 206 may represent a tangible and non-transitory computer-readable medium having stored therein computer programs, sets of instructions, code, or data to be executed by processor 202. Data may include, for example, virtual account numbers, transaction authorization requests associated with merchants and/or customers, and/or transaction histories associated with merchants and/or customers. Memory device 206 may include, for example, a removable memory chip (e.g., EPROM, RAM, ROM, DRAM, EEPROM, flash memory devices, or other volatile or non-volatile memory devices) or other removable storage units that allow instructions and data to be accessed by processor 202.

Memory 206 may also include any combination of one or more relational and/or non-relational databases controlled by memory controller devices (e.g., server(s), etc.) or software, such as document management systems, Microsoft® SQL database, SharePoint® databases, Oracle® databases, Sybase™ databases, other relational databases, or non-relational databases, such as key-value stores or NoSQL™ databases, such as Apache HBase™. In some embodiments, memory 206 may include an associative array architecture, such as a key-value storage, for storing and rapidly retrieving large amounts of information.

Programs 208 stored in memory 206 and executed by processor(s) 202 may include one or more operating systems and/or detection module 210. Programs 208 may also include one or more machine learning, trending, and/or pattern recognition applications (not shown) to detect an event at a merchant. For example, one or more machine learning, trending, and/or pattern recognition applications may provide, modify, or suggest input variables associated with one or more other programs 208.

Memory 206 may also store data that may reflect any type of information in any format that the system may use to perform operations consistent with the disclosed embodiments. Memory 206 may store instructions to enable processor 202 to execute one or more applications, such as server applications, an authentication application, network communication processes, and any other type of application or software. Alternatively, the instructions, application programs, etc., may be stored in an external storage (not shown) in communication with detection system 200 via network 108 or any other suitable network. Memory 206 may be a volatile or non-volatile, magnetic, semiconductor, tape, optical, removable, non-removable, or other type of storage device or tangible (i.e., non-transitory) computer-readable medium.

Memory 206 may include transaction histories 212. Transaction histories 212 may include information related to financial transaction authorization requests initiated by customers. For example, transaction histories 212 may include a number of transaction authorization requests associated with one or more merchants and/or customers, such as merchant(s) 102 and customer(s) 106 described above. In some embodiments, each transaction authorization request may indicate data associated with the transaction authorization request, such as data identifying the transacting customer that initiated the transaction, the transacting merchant at which the transaction occurred, a time of the transaction, a location of the transaction, an amount of the transaction, a product, service, or information associated with the purchase, or other information relating to the transaction. In some embodiments, each transaction authorization request may further include a virtual account number that indicates a bound merchant and/or a bound customer for the transaction. In some embodiments, transaction histories 212 may be stored in database 214 or in an external storage (not shown) in communication detection system 200 via network 108 or any other suitable network. An exemplary transaction consistent with transaction histories 212 is discussed in additional detail below in connection with FIG. 3.

I/O devices 204 may be one or more device that is configured to allow data to be received and/or transmitted by detection system 200. I/O devices 204 may include one or more digital and/or analog communication devices that allow detection system 200 to communicate with other machines and devices, such as other components of system 100 shown in FIG. 1. For example, detection system 200 may include interface components, which may provide interfaces to one or more input devices, such as one or more keyboards, mouse devices, and the like, which may enable detection system 200 to receive input from an operator of the system (not shown).

Detection system 200 may also contain one or more database(s) 214. Alternatively, detection system 200 may be communicatively connected to one or more database(s) 214. Detection system 200 may be communicatively connected to database(s) 214 through network 108. Database 214 may include one or more memory devices that store information and are accessed and/or managed through detection system 200. By way of example, database(s) 214 may include Oracle™ databases, Sybase™ databases, or other relational databases or non-relational databases, such as Hadoop sequence files, HBase, or Cassandra. The databases or other files may include, for example, data and information related to the source and destination of a network request and the data contained in the request, etc. Systems and methods of disclosed embodiments, however, are not limited to separate databases. Database 214 may include computing components (e.g., database management system, database server, etc.) configured to receive and process requests for data stored in memory devices of database(s) 214 and to provide data from database 214.

Detection system 200 may be a standalone computing system or part of an integrated computing system (not shown) associated with a financial service provider or any other organization. The standalone or integrated computing system may be configured to perform processes related to financial services. For example, programs executed by processor 202 may cause processor 202 to execute one or more processes related to financial services provided to customers including, but not limited to, processing credit and debit card transaction authorization requests, checking transaction authorization requests, fund deposits and withdrawals, transferring money between financial accounts, lending loans, processing payments for credit card and loan accounts, processing ATM cash withdrawals, or any other functions related to certain disclosed embodiments.

As discussed above, system 100 may include at least one detection system 104. Further, although sometimes discussed here in relation to detection system 104, it should be understood that variations of detection system 200 may be used by other components of system 100, including a financial service provider device, a merchant 102 device, a customer 106 device, and/or an intermediate system 112 device. Detection system 200 may be a single server or may be configured as a distributed computer system including multiple servers or computers that interoperate to perform one or more of the processes and functionalities associated with the disclosed embodiments.

In some aspects, a financial service provider device, a merchant 102 device, and/or a customer 106 device may include the same or similar configuration and/or components of detection system 200. For example, detection system 200, when implemented in a financial service provider device, may include hardware and/or software installed therein for performing one or more processes disclosed herein.

Figure 3A:
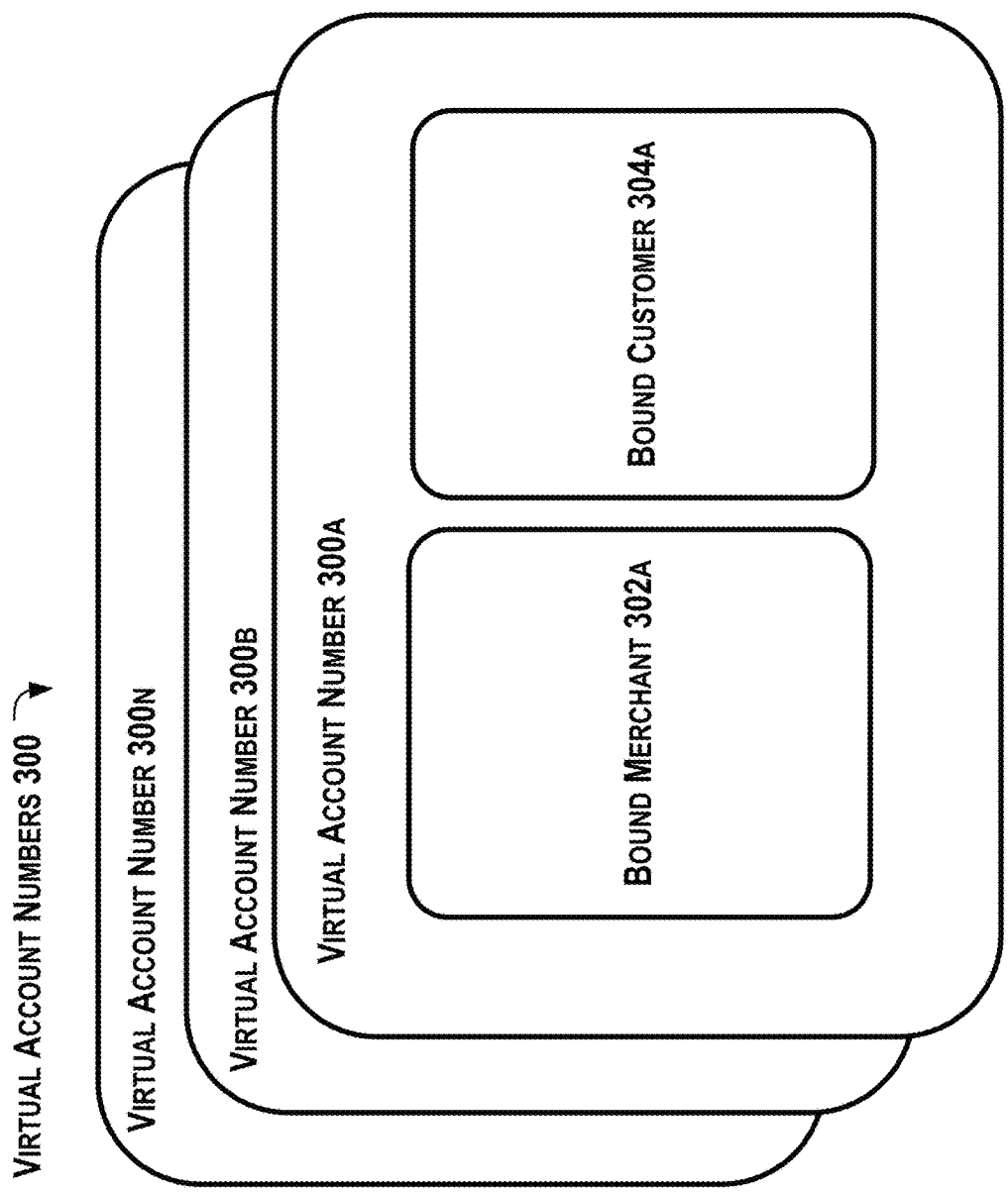
FIG. 3A is a block diagram of exemplary virtual account numbers, consisted with disclosed embodiments.

FIG. 3A provides a block diagram of exemplary virtual account numbers, consistent with disclosed embodiments. In some embodiments, transaction authorization requests may also include a virtual account numbers 300. As discussed above, the term "virtual account number" refers to a unique, merchant-specific reusable token linked to a customer's financial account at a financial service provider that may be used to facilitate a transaction instead of the financial account number itself. The virtual account number may be bound to a particular merchant and the customer's account. For example, virtual account number 300 may be set up by the customer to facilitate transaction authorization requests with a specific or bound merchant 302 (e.g., Macys®, Target®, etc.). The virtual account number may be bound to a particular merchant upon requesting generation of the virtual account number or in response to a first use of the virtual account number for a transaction with a merchant, etc. For example, the virtual account number 300 may be a randomly generated 16-digit number that may be used instead of a credit card number associated with the financial service account of customer 106 in order to facilitate and authorize a transaction between the customer 106 and the merchant 102. In this manner, the use of virtual account number 300 may act as a security measure by facilitating payment without disclosing or compromising the actual credit card number associated with the financial service account of customer 106. Additionally, if an event occurs such as the data breach of bound merchant 302, virtual account number 300 can be locked and unlocked without affecting other spending associated with the credit card account. For example, when and if it is discovered that the database of bound merchant 302 has been hacked, virtual account number 300 can be locked and a new virtual account number generated for the associated credit card account so that customer 106 is not required to replace his/her credit card once an event has occurred.

A customer 106 may set up a virtual account number at any type of payment gateway for a merchant 102, which may be through a webpage associated with the merchant 102. If the customer 106 has not previously set up a virtual account number 300 at merchant 102, they may be prompted at the payment gateway to confirm whether customer 106 would like to generate a virtual account number 300. Based on the webpage identifier (e.g., the URL), the merchant identifier or merchant attributes, and customer information, a virtual account number can be generated for a payment account of the customer and be bound to the merchant 106 in order to authorize future transaction authorization requests between customer 106 and merchant 302. By binding a virtual account number to the merchant 106, that virtual account number can only be used to complete future transaction requests with merchant 106. If the bound virtual account number is used to initiate a transaction at another merchant, the transaction authorization request may be declined by the account issuer.

In some embodiments, a financial service provider of a customer may monitor the interactions of customer 106 with one or more of software applications installed on the device of customer 106. The one or more software applications may include, but are not limited to, web browser applications and/or merchant applications, and the user interactions may include any user interaction with a website displayed via a web browser application. The financial service provider may monitor the customer's interaction through, for example, software (e.g., a browser plugin or extension) installed on the user's device. The financial service provider may determine if the customer 106 associated with the device is accessing a payment gateway and intends to purchase an item, based on monitoring the interactions of customer 106 with a website of merchant 102. This determination may be made, for example, based on customer 106 performing interactions such as clicking on a checkout button, accessing a checkout webpage displayed on a web browser software application installed on the device of customer 106, browsing a website of merchant 102, adding items in an online shopping, opening a mobile application installed on the user device, and/or clicking on an item in the website of merchant 102.

The financial service provider of customer 106, through the browser extension, for example, may display a prompt on the website of merchant 102 asking customer 106 if the user would like to generate a virtual account number 300 for the merchant that the user can use for future transactions. The prompt displayed on the website may display a message such as "Would you like to generate a new token?", with two options of "Yes" or "No" to select from. When customer 106 selects the "No" option, the financial service provider may determine that customer 106 would not like to generate a new virtual account number 300. When customer 106 selects the "Yes" option, however, the financial service provider may determine that customer 106 would like to perform a payment transaction with a new virtual account number 300.

The financial service provider may utilize the webpage identifier associated with the website of merchant 102 and user payment information to generate a virtual account number 300 that is unique to the website of merchant 102, where customer 106 is performing the first payment transaction. The financial service provider may receive user payment information from customer 106 as part of the first payment transaction. The user payment information may be received as an input from customer 106 via the website of merchant 102. As described above, the user payment information may include credit card number or account identifier, debit card number or account identifier, bank account number or account identifier, or any other suitable financial account number or identifier that may be utilized to provide payment. The financial service provider may associate and store in database 110, for example, the webpage identifier associated with the website of merchant 102, where customer 106 is performing the first payment transaction and the payment information received from customer 106.

The financial service provider may then generate a virtual account number 300 that is unique to the webpage identifier associated with the website of merchant 102, where customer 106 is performing the first payment transaction. The generated virtual number may be a sequence of numbers determined by the financial service provider to be unique to the website of merchant 102 where customer 106 is performing the first payment transaction. The generated virtual account number 300 may then be associated with the received payment information and the webpage identifier and stored in database 110 by the financial service provider. The virtual account number 300 may then be included in a list of virtual account numbers 300 stored in database 110. The virtual account number 300 may then be displayed on the website of merchant 102 for customer 106 to view. Customer 106 may then utilize the virtual account number 300 for any future transactions instead of providing their payment information.

Because virtual account number 300 is bound to a specific merchant, any use of the virtual account number 300 at a merchant that is not the bound merchant may indicate that an event has occurred. In some embodiments, virtual account number 300 may be used to implement a method for detecting an event at a merchant and providing warnings to the merchant that an event has occurred. For example, in the event that a fraudster obtains a compromised virtual account number 300, he may attempt to use the virtual account number at a merchant. The merchant may then send a single transaction authorization request 308 containing a virtual account number 300 that is bound to a different merchant. In this case, this mismatch between the transacting merchant and the bound merchant may indicate a fraudulent transaction. This mismatch may further indicate that an event has occurred at the bound merchant, such as a data breach. The event may, for example, have compromised the virtual account number 300 of customer 106, upon which a fraudster may attempt to use the compromised virtual account number 300 at another transacting merchant separate from bound merchant 302. Exemplary processes consistent with this method for detecting an event and notifying the merchant based on one or more transaction authorization requests are discussed in additional detail below in connection with FIGS. 4, 5, and 6. Additionally, an exemplary merchant notification system consistent with this disclosure is discussed in additional detail below in connection with FIG. 6.

Figure 3B:
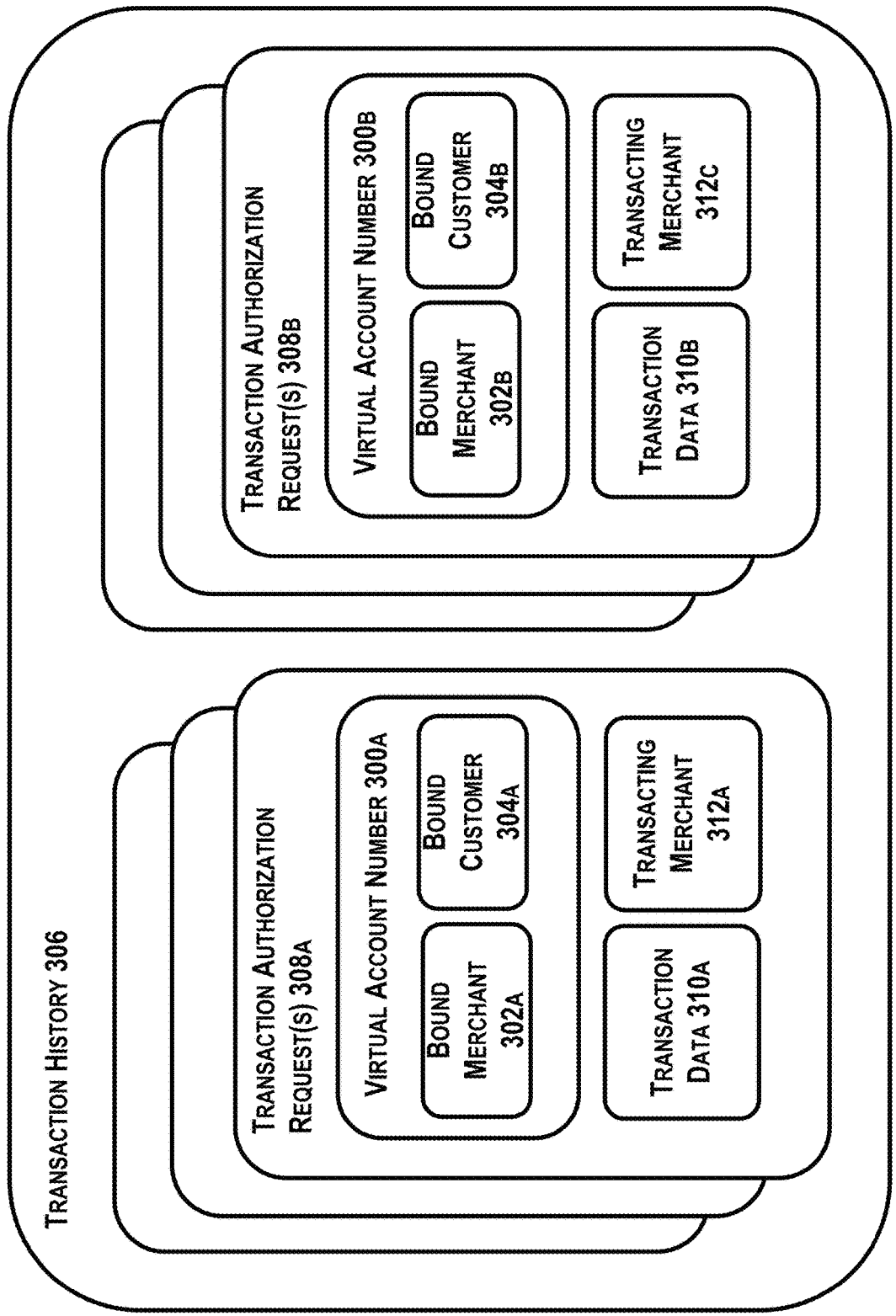
FIG. 3B is a block diagram of an exemplary transaction history, consistent with disclosed embodiments.

FIG. 3B shows an exemplary transaction history 306 containing one or more transaction authorization request(s) 308A and/or transaction authorization request(s) 308B. A transaction authorization request 308 will indicate a transacting merchant (not shown), referring to the merchant 102 providing a sale goods, service, and/or information in exchange for payment from customer 106 for the particular transaction authorization request 308. In some embodiments, a transaction authorization request 308 may include transaction data 310. Transaction data 310 may include information related to purchase or payment transaction authorization requests initiated by customer 106. For example, transaction data may include the virtual account number, a purchase price or payment amount, and any other relevant transaction or merchant-specific information including a location of the merchant and/or the location of the transaction. The purchase price may include a number representing the total sale price of the transaction and/or may include a list of the various items purchased from the merchant or a category of items purchased. In other embodiments, a payment amount may include a sum of the transaction amount and other general information related to the payment including the name of the merchant time and date of payment, and reason for payment etc.

In some embodiments, a merchant 102 may collect, generate, and provide transaction data relating to transaction authorization requests involving a customer 106 to system 100 and/or other components of system 100, such as a database 110 or a detection system 104. In some embodiments, a merchant 102 may further provide additional information to system 100 including product or service data (e.g., SKU data) and other data such as a geographical location of a merchant and/or the geographical location of the transaction and any other data relating to transaction authorization requests involving a customer. Merchant 102 may provide this information to system 100 through a communication 114 to network 108. Alternatively, transaction data 310 may be stored in database 214, which may be an external storage device in communication with detection system 200 via network 108 or any other suitable network.

FIG. 4 shows an exemplary process 400 for detecting an event based on a transaction and notifying a merchant 102 of the event. For example, a method consistent with disclosed embodiments may begin with step 402, where a transaction authorization associated with a transacting merchant is received, where the request may include a virtual account number associated with an account. The transaction authorization request may be received, for example, by detection system 104 through network 108. Once the transaction authorization request is received, a method consistent with disclosed embodiments may continue with step 404, where a bound merchant associated with the virtual account number is determined, where the virtual account number has been previously bound to the merchant. At step 406, it may be determined if the bound merchant corresponds with the transacting merchant. If there is a mismatch between the transacting merchant and the bound merchant, the process may continue to step 408, where an event is detected based on the mismatch. Upon detection of an event, the process may continue with step 410 by communicating notification of the event to the bound merchant via a communication interface. For example, it may be discovered that the transacting merchant is not the bound merchant 302, which may suggest that the virtual account number 300 has been compromised. In some embodiments, detection of a mismatch between a transacting merchant and a bound merchant in a single transaction authorization request may be sufficient to detect an event at the bound merchant. For example, when it can be determined that a virtual account number has been placed on file at a bound merchant, and no other activity by the customer indicates incorrect selection of a virtual number associated with the transaction authorization request, there may be a high likelihood of an occurrence of a compromising event at the bound merchant.

In some situations, analysis of a single transaction may not be sufficient to accurately detect an event at a transacting merchant or a bound merchant 302. For example, a single transaction indicating that a transacting merchant is not the bound merchant 302 may not provide enough data to support the conclusion that an event has occurred. In some situations, for example, customers may be enabled to select a previously generated virtual number (e.g. from a client device application, browser plugin, account webpage etc.) for use in a transaction and may accidentally use a virtual account number 300 at a transacting merchant that is not the bound merchant 302. In these situations, it may not be accurate or useful to notify one of the transacting merchant or bound merchant 302 that a data breach has occurred. In these situations, it may be helpful to determine whether a corresponding customer activity in association with the client device application, or browser extension, etc., was performed that may indicate a corresponding customer selection event. In some embodiments, a more accurate determination of whether a breach has occurred can be achieved by performing an analysis on a plurality of transaction authorization requests 308. For example, detecting an event may include determining a volume of transaction authorization requests 308 where a mismatch was detected between a transacting merchant and a particular bound merchant and detecting the event at the bound merchant based on the volume of mismatched transaction authorization requests.

In alternative embodiments, detecting an event may also include determining that a threshold of transaction authorization requests 308 where a mismatch was detected between a transacting merchant and a particular bound merchant and detecting the event based on the threshold has been reached. The term "threshold" may refer to a specific amount of transaction authorization requests 308 that indicate that the transacting merchant is different than the bound merchant 302. The specific amount of transaction authorization requests 308 may be one that is abnormally high for the specific transacting merchant or bound merchant 302 and may be fixed and/or determined through some type of statistical analysis. The threshold may be determined based on a variety of factors including, but not limited to, the size of the transaction and/or bound merchant 302, the average amount of transaction authorization requests at the transacting and/or bound merchant 302 in a certain period of time, the average amount of time that a customer will accidentally use a virtual account number at a transacting merchant that is not the bound merchant 302, etc. For example, a lower threshold may be set for a smaller merchant, meaning that a lower amount of detected mismatches between a transacting merchant and a particular bound merchant would trigger a detection of the event whereas a higher threshold may be set for a larger merchant.

In some embodiments, detecting an event may additionally or alternatively include detecting an event based on a bound customer. Once established, a virtual account number may be used by a customer to authorize transactions with a single merchant. Because every virtual account number is uniquely established for a single customer with a single merchant, all transaction authorization requests may not only indicate a bound merchant but also a bound customer. Previously discussed embodiments may detect an event based on a mismatch between one or more transacting merchants and a bound merchant. Additionally, or alternatively, however, the detection may be based on the bound customer. This detection may be achieved, for example, by requesting a response from the bound customer indicating whether they intended to make a specific purchase. This request for a response may be based on a mismatch between a transacting merchant and a bound merchant or by any other suspicious activity that may suitably indicate that an event may have occurred. The request may be made through any suitable means of communication with the customer, including a communication interface or software installed on the customer's device (e.g., a browser plugin or extension). Further, once an event has been detected through any one of the disclosed methods and systems, notification may be communicated to the bound customer through a communication interface.

Figure 5:
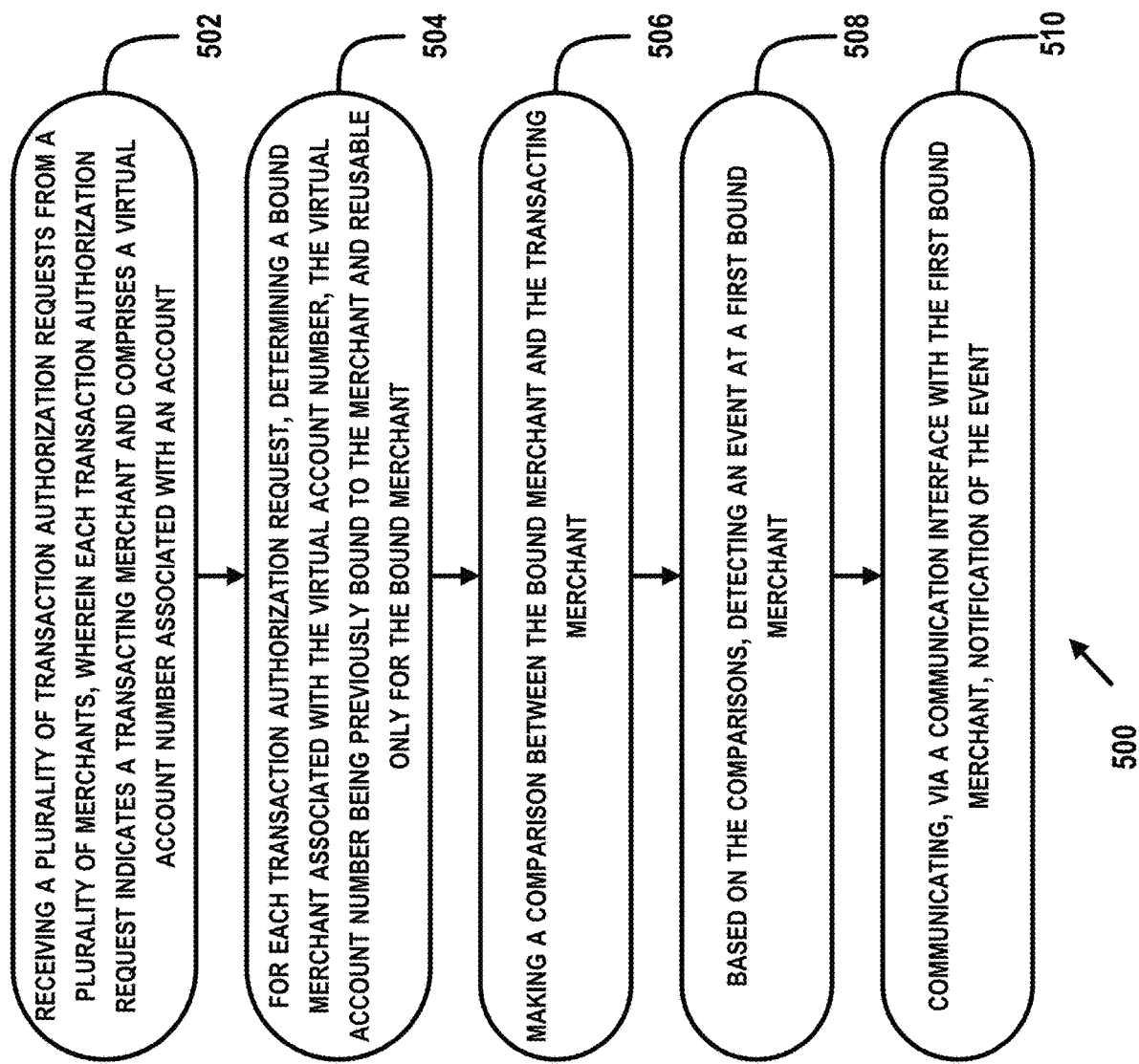
FIG. 5 is a flow chart of an exemplary process for detecting an event at a merchant based on a plurality of transaction authorization requests from a plurality of merchants and notifying the merchant of the event, consistent with disclosed embodiments.

FIG. 5 shows an exemplary process 500 for detecting an event based on a plurality of transaction authorization requests from a plurality of merchants and notifying a merchant 102 of the event. For example, a method consistent with disclosed embodiments may begin with step 502, where a plurality of transaction authorization requests are received from a plurality of merchants. Each transaction authorization request may indicate a transacting merchant and may include a virtual account number associated with an account. The transaction authorization requests may be received, for example, by detection system 104 from a merchant 102 and/or an intermediate system 112 through network 108.

Once the transaction authorization requests 308 are received, a method consistent with disclosed embodiments may continue with step 504, where, for each transaction authorization request, a bound merchant associated with the virtual account number is determined, where the virtual account number has been previously bound to the merchant and reusable only for the bound merchant. Process 500 may continue with step 506, where a comparison is made between the bound merchant and the transacting merchant. At step 508, the comparisons are used to detect an event at a first bound merchant, which may be based on one or more mismatches between the first bound merchant and at least one transacting merchant for the plurality of transaction authorization requests. In other words, step 508 might include determining that at least one transaction authorization request within the plurality of transaction authorization requests indicates a mismatch between at least one transacting merchant and a single bound merchant. These determinations would indicate that that a virtual account number was used at a transacting merchant that is not the bound merchant associated with the virtual account number, which may suggest that an event compromising the bound merchant has occurred.

In some situations, a single determination that the transacting merchant is not the bound merchant may not be sufficient to accurately detect an event. For example, a single transaction indicating that a transacting merchant is not the bound merchant may not provide enough data to support the conclusion that an event has occurred. In some embodiments, a more accurate determination of whether a breach has occurred can be achieved by performing an analysis on the plurality of transaction authorization requests 308. For example, detecting an event may include determining a volume of transaction authorization requests associated with the first bound merchant and detecting the event based on the volume of transaction authorization requests. Further, detecting an event may also include determining a threshold for the first bound merchant and detecting the event based on the threshold. In some embodiments, each transaction authorization request in the plurality of transaction authorization requests may include transaction data including, for example, a transaction location. In some embodiments, detecting an event may be based on the locations of the plurality of transaction authorization requests and a location of the first merchant. Once an event is detected by one or more of the disclosed methods, the process may continue to step 510 where notification of the event is communicated to the bound merchant via a communication interface.

Consistent with the present disclosure, the disclosed methods may further include communicating, via a communication interface with a merchant 102, notification that an event has occurred. For example, it may be determined through one or more of the disclosed methods that an event has occurred at the merchant 102. This determination may be made by a detection system 104 as part of system 100. Upon making this determination, the detection system 104 and/or an intermediate system 112 (e.g., a financial service provider) may send a notification to merchant 102 warning them of the event through communication channels 114 as part of network 108. Communication channels 114 may include one or more methods of communication, such as email, text messages, phone calls, etc. Notifying the merchant 102 may also include maintaining real-time communication between detection system 104 and merchant 102. For example, the merchant 102 may be provided with a computer program or website allowing the merchant to monitor the activity of detection system 104 regarding transaction authorization requests associated with merchant 102.

The disclosed methods may be executed, for example, by a system 100 including detection system 200. Detection system 200, via detection module 210, may implement the steps, as illustrated in FIGS. 4, 5 and 6. However, the steps illustrated in the flowchart are only exemplary. One or more steps may be added or deleted to detect an event at a merchant 102. For example, detection system 200 may have memory 206 and/or database(s) 214 acting as a data storage including transaction histories 212, where each transaction includes a virtual account number 300 indicating a bound merchant 302. Further, the system may include a communication interface, such as I/O device 204, communicatively coupled to a plurality of merchants 102. Detection module 210 may be configured to receive through the communication interface transaction authorization requests 308 from each merchant 102 in the plurality of merchants and update transaction histories 212 to include those transaction authorization requests 308. For each merchant, the detection module 210 may be further configured to detect an event based on the updated transaction histories 212 by using any one or more of the processes and/or methods disclosed herein. Upon detection of an event at a merchant 102, detection module 210 may further be configured to notify the merchant 102 through the communication interface. The communication interface may, for example, be a merchant device with display 700 configured to display alert 702 upon notification.

FIG. 6 provides flow chart of an exemplary process 600 for implementation in disclosed systems, such as detection system 200, for detecting an event based on a first bound merchant, a first transacting merchant and a history of transaction authorization requests for the first bound merchant, consistent with disclosed embodiments. Process 600 may begin at step 602, where a first transaction authorization request from a first transacting merchant is received through the communication interface, where the first authorization request includes a first virtual account number. At step 604, a first bound merchant associated with the received virtual account number may be determined based on the virtual account number. At step 606, an event may be detected based on the first bound merchant, the first transacting merchant, and the history of transaction authorization requests for the first bound merchant. Once an event is detected, notification of the event may be communicated through the communication interface.

FIG. 7 illustrates an example of a communication interface, consistent with the present disclosure. In some embodiments, as shown, the notification is provided through a computing device of the merchant with display 700. Notification of the event may be provided to the merchant through software (e.g., browser plugin or extension) installed on the computing device of the merchant. The software may be associated with, for example, a provider of detection system 104. Once an event is detected by detection system 104, a notification may be sent to the customer in the form of alert 702 displayed on display 700. In this example, the event may be due to third-party hacking or a listening virus compromising the database of merchant 102. Once the merchant 102 is made aware of this event through alert 702, the merchant 102 may begin to take remedial action addressing the event. In embodiments where the customer 106 is notified of an event, the customer 106 may also have a device, for example, capable of receiving similar notifications and alerts to the customer 106. While FIG. 7 shows display 700 on a computing device, it will be understood that the notification is not so limited and may be communicated by any suitable means, such as by telephone, mail, or other forms of electronic communication.

The described techniques may be varied and are not limited to the examples or descriptions provided. In some embodiments, some or all of the logic for the above-described techniques may be implemented as a computer program or application, as a plug-in module or sub-component of another application, or as hardware components.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. The claims are to be interpreted broadly based on the language employed in the claims and not limited to examples described in the present specification. Accordingly, the examples presented herein are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples but, instead, are defined by the appended claims in light of their full scope of equivalents.

What is claimed is:

1. A computer-implemented method, comprising:
   detecting a user input interacting with a graphic user interface of a user device;
   determining, based on the detected user input, an online activity of a user associated with the user device, the online activity comprising the user interacting with a checkout button at a first website;
   detecting, based on the online activity and via software installed on the user device, that the user is in a process of purchasing an item at the first website;
   in response to the detection that the user is in the process of purchasing the item at the first website, causing a display associated with the user device to present, on the first website in the graphical user interface, a prompt requesting an approval for using a unique virtual account number associated with an account of the user;

receiving, when the user selects, via the graphic user interface, an option displayed in the prompt input indicating an approval for using the unique virtual account number;

in response to the received input, generating the unique virtual account number associated with the website, wherein generating the unique virtual account number comprises:

determining at least one identifier or attribute associated with the first website;

determining user payment information; and generating the unique virtual account number such that the unique virtual account number is associated with an account of the user associated with the user payment information and is bound with a merchant associated with the at least one identifier or attribute associated with the first website;

displaying, via the user interface of the user device, the generated unique virtual account number;

storing, in at least one database and as part of an associative array architecture within at least one memory component, the unique virtual account number bound with the merchant associated with the first website, the associative array architecture including multiple unique virtual account numbers bound with different respective merchants;

receiving a transaction authorization request associated with a transacting merchant, the authorization request comprising the unique virtual account number;

determining the merchant bound with the retrieved unique virtual account number by retrieving the generated unique virtual account number from the associative array architecture;

detecting an event by determining a mismatch between the transacting merchant and the merchant bound with the retrieved unique virtual account number;

displaying, in real-time, via a dedicated link and a communication interface of a computing device associated with the merchant bound with the generated unique virtual account number and in response to the determined mismatch, a notification of the detected event; and in response to the merchant bound with the retrieved unique virtual account number taking remedial action addressing the detected event, via the dedicated link and the communication interface of the computing device associated with the merchant bound with the retrieved unique virtual account number, providing, to the merchant bound with the retrieved unique virtual account number, a computer program or second website for maintaining real-time communication with the merchant bound with the retrieved unique virtual account number, the computer program or second website enabling the merchant bound with the retrieved unique virtual account number to monitor activity regarding future transaction authorization requests associated with the merchant bound with the retrieved unique virtual account number.

2. The method of claim 1, wherein the unique virtual account number is a randomly generated number configured for authorizing transactions associated with the bound merchant without authorizing transactions with other merchants.

3. The method of claim 1, further comprising locking the unique virtual account number on a communication interface associated with a customer bound with the unique virtual account number such that the customer is no longer enabled to select the unique virtual account number from a list of previously generated virtual account numbers.

4. The method of claim 1, wherein detecting the event comprises:

determining a threshold of transaction authorization requests associated with the bound merchant where the transacting merchant is not the bound merchant; and detecting the event based on the threshold.

5. The method of claim 1, wherein:

the transaction authorization request indicates at least of one of a time, a location, and an amount; and detecting the event comprises detecting the event based on at least one of the time, the location, and the amount.

6. The method of claim 1, wherein:

the unique virtual account number is further bound with a customer; and detecting the event comprises detecting the event based on the bound customer.

7. The method of claim 6, wherein detecting the event based on the bound customer comprises:

requesting a response from the bound customer; and based on the response, detecting the event.

8. The method of claim 6, wherein the unique virtual account number is a token bound to a single merchant and is reusable in future transactions with only the bound single merchant.

9. A computer-implemented method, comprising:

generating a plurality of unique virtual account numbers, each unique virtual account number being associated with an account and bound with a respective merchant, wherein the plurality of unique virtual account numbers comprise a first unique virtual account number bound with a first merchant;

generating the first unique virtual account number by:

detecting a user input interacting with a graphic user interface of a user device;

determining, based on the detected user input, an online activity of a use associated with the user device, the online activity comprising the user interacting with a checkout button at a first website;

detecting, based on the online activity and via software installed on the user device, that the user is in process of purchasing an item at the first website associated with the first merchant;

in response to the detection that the user is in the process of purchasing the item at the first website, causing a display associated with the user device to present, on the first website, a prompt requesting an approval for using the first unique virtual account number associated with an account of the user;

receiving, when the user selects, via the graphic user interface, an option displayed in the prompt, input indicating an approval for using the first unique virtual account number; and in response to receiving the input, generating the first unique virtual account number, wherein generating the first unique virtual account number comprises:

○ determining at least one identifier or attribute associated with the first website;

○ determining user payment information; and

○ generating the first unique virtual account number such that the first unique virtual account number is associated with an account of the user associated with the user payment information and is bound with a merchant associated with the at least one identifier or attribute associated with the first website;

storing, in at least one database and as part of an associative array architecture within at least one memory component, each unique virtual account number bound with a respective merchant associated with the first website;

receiving a plurality of transaction authorization requests from a plurality of merchants, wherein each transaction authorization request indicates a transacting merchant and comprises a unique virtual account number;

for each transaction authorization request in the plurality of transaction authorization requests, retrieving a respective unique virtual account number from the associative array architecture to:

(i) determine the first merchant bound with a particular one of the respective retrieved unique virtual account numbers, the particular retrieved unique virtual account number being previously bound to the first merchant and reusable only for the first merchant to which it is bound; and (ii) compare the merchant bound with the particular retrieved unique virtual account number and the transacting merchant;

based on the comparison, detecting an event associated with the first bound merchant;

displaying, in real-time, via a dedicated link and a communication interface of a computing device associated with the first bound merchant, a notification of the detected event; and in response to the first bound merchant taking remedial action addressing the detected event, via the dedicated link and the communication interface of the computing device associated with the first bound merchant, providing to the first bound merchant a computer program or second website for maintaining, real-time communication with the first bound merchant, the computer program or second website enabling the first bound merchant to monitor activity regarding future transaction authorization requests associated with the first bound merchant with the retrieved unique virtual account number.

10. The method of claim 9, wherein detecting the event at the first bound merchant comprises:

determining, for a first authorization request, that (i) the first bound merchant is associated with the particular retrieved virtual account number and (ii) the transacting merchant is not the first bound merchant.

11. The method of claim 9, wherein detecting the event at the first bound merchant comprises:

determining, for two or more authorization requests associated with two transacting merchants, that (i) the first bound merchant is associated with the particular retrieved virtual account number and (ii) neither of the two transacting merchants are the first bound merchant.

12. The method of claim 9, wherein the notification and the computer program or second website is provided to the first bound merchant via a dedicated link.

13. The method of claim 9, wherein:

the transaction authorization requests indicate locations; and detecting the event comprises detecting the event based on a mismatch between the locations and a location of the first bound merchant.

\* \* \* \* \*